United States Patent
Lev et al.

(10) Patent No.: US 7,515,405 B2
(45) Date of Patent: Apr. 7, 2009

(54) ANTI-ROTATION MECHANISM FOR AN ELECTRONIC DEVICE

(75) Inventors: Jeffrey A. Lev, Houston, TX (US); Paul J. Doczy, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 337 days.

(21) Appl. No.: 11/492,436

(22) Filed: Jul. 25, 2006

(65) Prior Publication Data

US 2008/0024964 A1 Jan. 31, 2008

(51) Int. Cl.
*G06F 1/16* (2006.01)
(52) U.S. Cl. .................. 361/683; 361/681
(58) Field of Classification Search ............ 361/683
See application file for complete search history.

(56) References Cited

U.S. PATENT DOCUMENTS

| | | | | |
|---|---|---|---|---|
| 3,334,936 A * | 8/1967 | Donselaar et al. | ........ | 292/251.5 |
| 5,206,790 A | 4/1993 | Thomas et al. | | |
| 5,464,083 A | 11/1995 | Arnold et al. | | |
| 5,841,631 A | 11/1998 | Shin et al. | | |
| 6,654,068 B1 | 11/2003 | Brewington et al. | | |
| 6,754,081 B2 | 6/2004 | Rude et al. | | |
| 6,798,646 B2 | 9/2004 | Hsu | | |
| 6,891,722 B2 * | 5/2005 | Chen et al. | ........... | 361/685 |
| 6,912,122 B2 | 6/2005 | Chen et al. | | |
| 6,958,902 B2 | 10/2005 | Tseng et al. | | |
| 6,989,985 B2 * | 1/2006 | Tanimoto et al. | ........... | 361/681 |
| 7,156,351 B2 * | 1/2007 | Wang et al. | ........... | 361/683 |
| 7,221,562 B2 * | 5/2007 | Song | ........... | 361/681 |
| 7,277,086 B2 * | 10/2007 | Sugihara | ........... | 361/681 |
| 7,283,355 B2 * | 10/2007 | Han | ........... | 361/683 |
| 2003/0048600 A1 | 3/2003 | Hsu et al. | | |
| 2003/0052857 A1 | 3/2003 | Pappas | | |
| 2005/0087993 A1 | 4/2005 | Lin | | |
| 2005/0201045 A1 * | 9/2005 | Lo et al. | ........... | 361/679 |
| 2005/0207104 A1 * | 9/2005 | Love | ........... | 361/683 |
| 2005/0236848 A1 | 10/2005 | Kim | | |
| 2005/0286215 A1 | 12/2005 | Yang et al. | | |
| 2006/0067038 A1 * | 3/2006 | Lev et al. | ........... | 361/683 |

FOREIGN PATENT DOCUMENTS

EP 1 635 246 3/2006

OTHER PUBLICATIONS

International Search Report dated Jan. 9, 2008.

* cited by examiner

*Primary Examiner*—Lisa Lea-Edmonds

(57) ABSTRACT

An electronic device comprises a display member pivotally and rotationally coupled to a base member and an anti-rotation mechanism configured to be magnetically responsive to prevent rotational movement of the display member relative to the base member based on a position of the display member relative to the base member.

20 Claims, 2 Drawing Sheets

ANTI-ROTATION MECHANISM FOR AN ELECTRONIC DEVICE

BACKGROUND OF THE INVENTION

Some electronic devices are configured having a display element (e.g., with a liquid crystal display (LCD) or other type of viewing screen) that is pivotable about one axis and rotatable about a different axis to facilitate facing the screen in a variety of different directions relative to an attached base member. These types of electronic devices generally comprise a center-located hinge assembly that facilitates rotation and pivotal movement of the display element relative to the base member. Thus, in a notebook computer type of device, for example, the screen of the display element may be positioned to facilitate use of the device in a notebook mode or a tablet mode. However, because of the design of the hinge assembly, unwanted rotation of the display member may result (e.g., unwanted rotational or side-to-side movement of the display member while the display member is being used in a tablet mode).

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
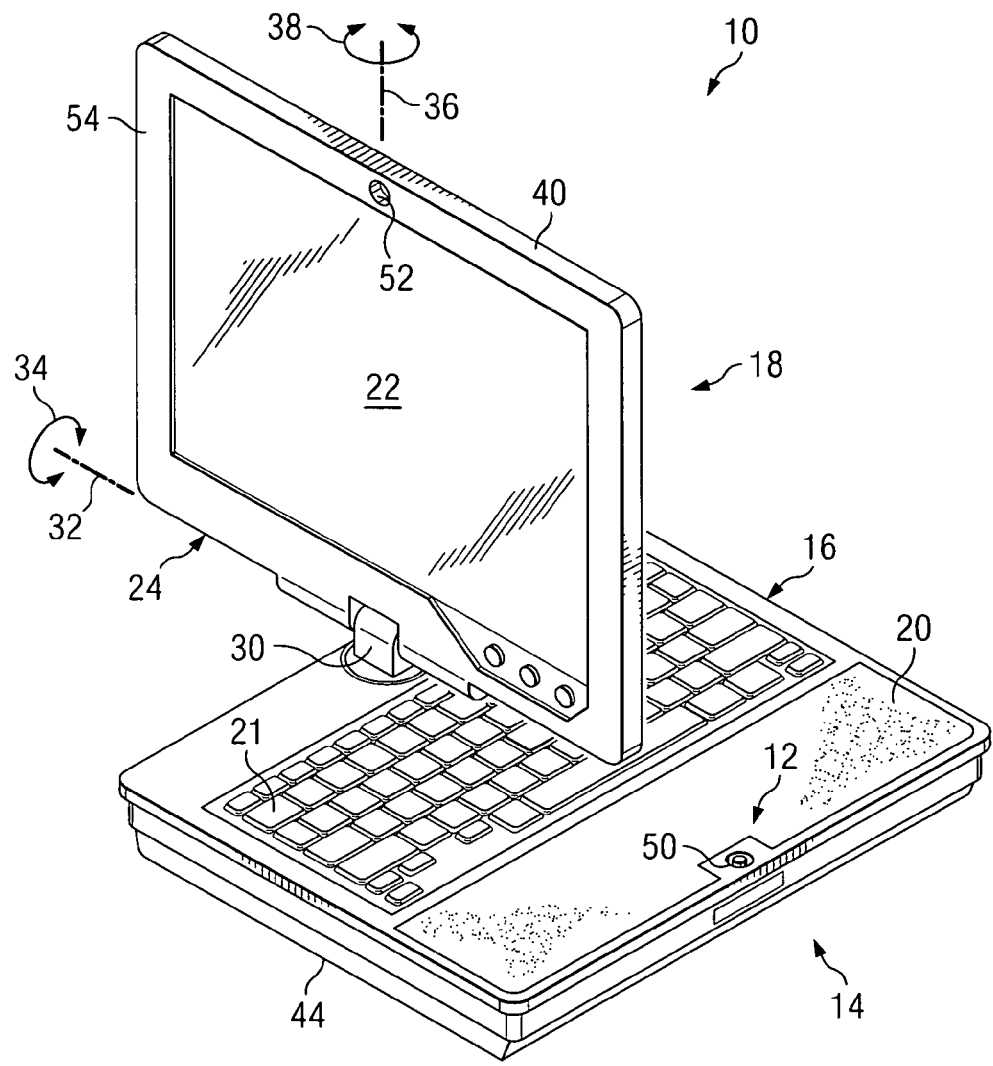
FIG. 1 is a diagram illustrating an electronic device in which an embodiment of an anti-rotation mechanism in accordance with the present invention is employed to advantage.
Figure 2:
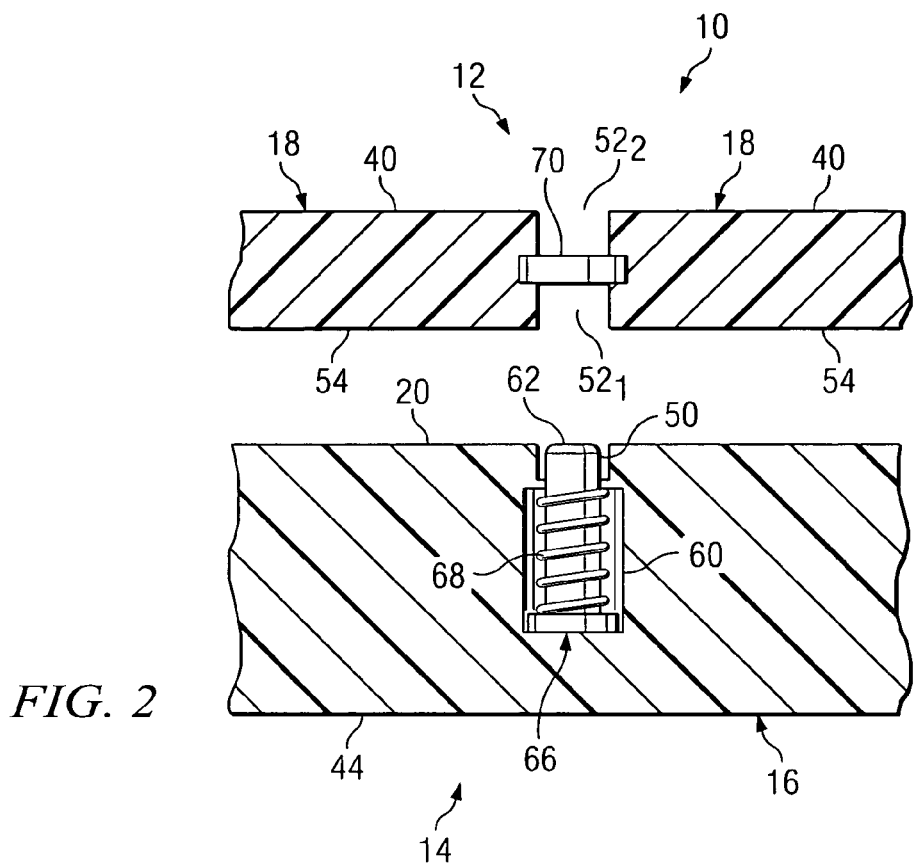
FIG. 2 is a diagram illustrating a section view of the anti-rotation mechanism illustrated in FIG. 1 in a retracted position.
Figure 3:
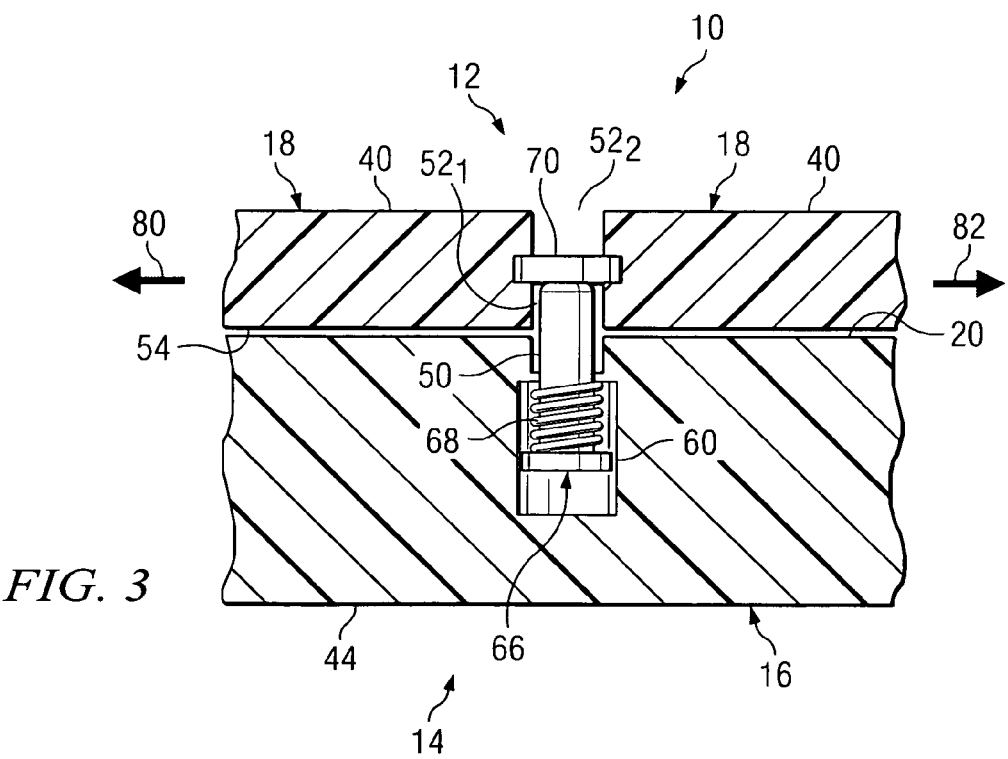
FIG. 3 is a diagram illustrating a section view of the anti-rotation mechanism illustrated in FIG. 1 in an extended position.

The preferred embodiments of the present invention and the advantages thereof are best understood by referring to FIGS. 1-3 of the drawings, like numerals being used for like and corresponding parts of the various drawings.

FIG. 1 is a diagram illustrating an electronic device 10 in which an embodiment of an anti-rotation mechanism 12 in accordance with the present invention is employed to advantage. In the embodiment illustrated in FIG. 1, electronic device 10 comprises a convertible portable computer 14 having a base member 16 and a display member 18. In FIG. 1, base member 16 comprises a working surface 20 having a keyboard 21 and/or other types of user interface elements (e.g., a trackpad and/or other types of interface control elements) to facilitate use of computer 14 by a user. Display member 18 comprises a screen 22 for providing visual content to a user and/or receiving input from a user (e.g., a liquid crystal display (LCD), touchscreen, or other type of visual input/output element) surrounded and/or otherwise supported by a display housing 24.

In the embodiment FIG. 1, display member 18 is preferably coupled to base member 16 to enable screen 22 to face a variety of different directions, thereby enabling convertible use of device 10 (e.g., use of computer 14 in either a laptop mode or tablet mode). For example, in some embodiments of the present invention, display member 18 is coupled to base member 16 by a hinge assembly 30 that is configured to enable pivotal movement of display member 18 relative to base member 16 about an axis 32 in the directions indicated by arrows 34 and rotational movement of display member 18 relative to base member 16 about an axis 36 in the directions indicated by arrows 38. It should be understood that the direction or orientation of axes 32 and 36 may change based on the position and/or orientation of display member 18. Thus, for example, display member 18 is rotatable about axis 36 and pivotable about axis 32 such that a rear side 40 of display member 18 may be positioned against and/or facing working surface 20, thereby enabling use of computer 14 in a tablet mode. Further, for example, display member 18 is rotatable about axis 36 and pivotable about axis 32 to facilitate locating screen 22 to face generally toward working surface 20 to enable use of computer 14 in a laptop mode. It should also be understood that in some embodiments of the present invention, computer 14 may be configured to facilitate movement of display member 18 such that display member 18 may be positioned adjacent to and/or against a bottom side 44 of base member 16 (e.g., having either screen 22 or rear side 40 of display member 18 facing bottom side 44). Although the embodiment of anti-rotation mechanism 12 is described and/or illustrated herein in connection with convertible portable computer 14, it should be understood that anti-rotation mechanism 12 may be used with other types of electronic devices where a display member is configured to be pivotally and rotationally moveable about at least two different axes relative to a base member such as, but not limited to, a cellular telephone.

Preferably, hinge assembly 30 is configured as a friction clutch hinge assembly 30 such that hinge assembly 30 may be used to pivotally secure display member 18 in a fixed and/or desired position relative to base member 16 (e.g., in an open position (as illustrated in FIG. 1) or in a position where display member 18 is disposed against and/or in close proximity to working surface 20 (e.g., in a closed position or in a tablet mode position) or bottom side 44 of base member 16). Thus, preferably, hinge assembly 30 is configured to facilitate a latchless base member 16 (i.e., without a latch or locking mechanism for securing display member 18 against or in close proximity to base member 16 such as in a closed position or tablet mode position).

In the embodiment illustrated in FIG. 1, anti-rotation mechanism 12 comprises at least one pin member 50 disposed within base member 16 and configured to be extendable and retractable relative to base member 16 in response to a magnetic field. Anti-rotation mechanism 12 also comprises at least one recess 52 formed in display member 18 for receiving pin member 50 therein when pin member 50 is in an extended position relative to base member 16. In the embodiment illustrated in FIG. 1, recess 52 is disposed in a screen side 54 of display housing 24 such that when display member 18 is positioned having screen 22 facing toward working surface 20, recess 52 is positioned to face and/or be aligned with pin member 50 to facilitate receipt of pin member 50 therein (e.g., when display member 18 is disposed against and/or in close proximity to working surface 20). Thus, in operation, when pin member 50 is in an extended position relative to base member 16 and disposed within recess 52 (e.g., when display member 18 is in a closed position relative to base member 16), the engagement of pin member 50 with recess 52 prevents rotation of display member 18 relative to base member 16 about axis 36. In the embodiment illustrated in FIG. 1, pin member 50 and corresponding recess 52 are formed having a circular and/or cylindrical configuration. However, it should be understood that pin member 50 and corresponding recess 52 may be configured having other shapes. In the embodiment illustrated in FIG. 1, anti-rotation mechanism 12 is located at a position on base member 16 and display member that is nearly furthest away from hinge assembly 30, thereby providing greater stability for non-rotation of display member 18 relative to base member 16. However, it should be understood that anti-rotation mechanism 12 may be otherwise located relative to base member 16 and display member 18.

FIG. 2 is a diagram illustrating a section view of anti-rotation mechanism 12 illustrated in FIG. 1 in a retracted position, and FIG. 3 is a diagram illustrating a section view of anti-rotation mechanism 12 illustrated in FIG. 1 in an extended position. In FIGS. 2 and 3, display member 18 is illustrated in a position having screen side 54 of display member 18 disposed facing base member 16, and in FIG. 2, display member 18 is illustrated as being located slightly spaced apart from base member 16. In the embodiment illustrated in FIGS. 2 and 3, base member 16 comprises a cavity 60 for housing pin member 50 therein. Preferably, in a retracted position (FIG. 2), pin member 50 is positioned relative to base member 16 such that a top surface 62 of pin member 50 is disposed flush with working surface 20 of display member 16. However, it should be understood that anti-rotation mechanism 12 may be configured such that, in a retracted position, top surface 62 of pin member 50 may be disposed slightly above or slightly below working surface 20.

In the embodiment illustrated in FIGS. 2 and 3, anti-rotation mechanism 12 comprises a biasing element 66 for biasing pin member 50 to the retracted position relative to base member 16 (FIG. 1). In FIGS. 2 and 3, biasing element 66 comprises a spring 68. However, it should be understood that other types of elements may be used to bias pin member 50 to the retracted position. In the embodiment illustrated in FIGS. 2 and 3, anti-rotation mechanism 12 comprises a magnet 70 disposed within display member 18 for generating a magnetic field to cause movement of pin member 50 from a retracted position (FIG. 2) to an extended position (FIG. 3). For example, pin member 50 is preferably configured from a metallic material that is responsive to a magnetic field such that the magnetic field generated by magnet 70 causes pin member 50 to move from a retracted position to an extended position relative to base member 16 as magnet 70 approaches or comes in close proximity to pin member 50. However, it should be understood that the location of the element generating the magnetic field may be otherwise configured and/or reversed (e.g., a metallic element may be disposed in display member 18 and pin member 50 may be magnetized). Additionally, it should be understood that, in addition to magnet 70, pin member 50 may be magnetized. Further, it should be understood that the location of magnet 70 and pin member 50 may be otherwise reversed in members 16 and 18 (e.g., extendable and retractable pin member 50 disposed in display member 18 and magnet 70 disposed in base member 16).

In the embodiment illustrated in FIGS. 2 and 3, display member 18 is configured having two recesses 52 (e.g., recess $52_1$ disposed on screen side 54 of display member 18 and recess $52_2$ disposed on rear side 40 of display member 18) such that when display member 18 is disposed against and/or otherwise in close proximity to working surface 20 of base member 16 (e.g., in either a closed position for a laptop mode or in a position for use in a tablet mode), either recess $52_1$ or $52_2$ is positionable and/or alignable with pin member 50 corresponding to a side of display member 18 facing working surface 20.

Thus, in operation, in response to magnet 70 approaching and/or otherwise nearing working surface 20, the magnetic field generated by magnet 70 causes pin member 50 to extend through an opening 74 formed in base member 16 from a retracted position (FIG. 2) to an extended position (FIG. 3). Preferably, when recess $52_1$ is aligned with pin member 50 (and display member 18 is located against or in close proximity to working surface 20), pin member 50 extends into recess $52_1$ (FIG. 3), thereby preventing rotational movement of display member 18 relative to base member 16 (e.g., preventing side-to-side movement of display member 18 relative to base member 16 in the directions indicated by arrows 80 and 82 in FIG. 3 when display member 18 is disposed in a closed position or tablet position relative to base member 16). Correspondingly, in response to movement of display member 18 away from base member 16, the magnetic field generated by magnet 70 weakens relative to pin member 50, thereby enabling biasing element 66 to cause retraction of pin member 50 into base member 60 (FIG. 2). As illustrated in FIGS. 2 and 3, display member 18 is configured having recess $52_2$ disposed on rear side 40 of display member 18 such that if rear side 40 of display member 18 is positioned facing toward working surface 20 (e.g., in a tablet mode of use of computer 14), pin member 15 is extendable relative to base member 16 into recess $52_2$ of display member 18, thereby preventing rotation of display member 18 about axis 36 when display member 18 is disposed against and/or in close proximity to working surface 20.

In the embodiment illustrated in FIGS. 2 and 3, a single pin member 50 is illustrated. However, it should be understood that, additionally or alternatively, pin member 50 may be extendable and retractable relative to bottom side 44 of base member 16. For example, if computer 14 is configured to enable pivotal movement of display member 18 such that display member 18 is positionable against and/or in close proximity to bottom side 44 of base member 16, base member 16 may be configured such that pin member 50 is extendable and retractable relative to bottom side 44 of base member 16 to prevent rotation of display member 18 about axis 36 when display member 18 is disposed against and/or in close proximity to bottom side 44 of base member 16. Thus, for example, in some embodiments of the present invention, base member 16 may be configured with multiple pin members 50 (e.g., one pin member 50 extendable and retractable relative to working surface 20 and another pin member 50 extendable and retractable relative to bottom side 44). It should also be understood that base member 16 may be configured having a single pin member 50 that is extendable and retractable relative to both working surface 20 and bottom side 44 (e.g., a single pin member 50 that is moveable throughout the thickness of base member 16 to facilitate extension and retraction of pin member 50 relative to both working surface 20 and bottom side 44). Further, it should be understood that if the location of pin member 50 and magnet 70 are reversed relative to display member 18 and base member 16 (e.g., pin member 50 disposed in display member 18 and magnet 70 disposed in base member 16), the quantity of pin members 50 and recesses 52 and their corresponding interaction may varied and configured as described above. It should also be understood that multiple magnets 70 may be used (e.g., each magnet facing a different direction to accommodate a polarity attraction of a magnetized pin member 50).

Thus, embodiments of the present enable an electronic device 10 to have latchless base member 16 (thereby providing more room in base member for other components) while preventing rotation of the display member 18 relative to the base member 16 based on a position of the display member 18 relative to the base member 16 (e.g., when the display member 18 is disposed against or in close proximity to the base member such as when using display member 18 in a tablet mode or when display member 18 is in a closed position relative to base member 16). Further, embodiments of the present invention provide a mechanism to prevent rotation of display member 18 relative to base member 16 that is magnetically responsive, thereby being less susceptible to mechanical failure and providing automatic actuation (i.e., not requiring a user to activate the mechanism).

What is claimed is:

1. An electronic device, comprising:
 a display member pivotally and rotationally coupled to a base member; and
 an anti-rotation mechanism including a pin member that moves in response to a magnetic field to a position between the display member and base member to prevent rotational movement of the display member relative to the base member based on a position of the display member relative to the base member, wherein the rotational movement between the display member and the base member is prevented without either a latch or a locking mechanism securing the display member to the base member.

2. The electronic device of claim 1, wherein the anti-rotation mechanism comprises multiple pin members extendable and retractable relative to both bottom and top sides of the base member.

3. The electronic device of claim 1, wherein the pin member is moveable throughout a thickness of the base member to extend and retract through both top and bottom surfaces of the base member.

4. The electronic device of claim 3, wherein the pin member moves to both retracted and extended positions without requiring a user to activate the anti-rotation mechanism.

5. The electronic device of claim 1, wherein the pin member extends from a retracted position into a recess formed in at least one of the display member and the base member.

6. The electronic device of claim 1 further comprising, a friction clutch hinge assembly.

7. The electronic device of claim 6, further comprising at least one recess formed in the display member for receiving the pin member therein.

8. The electronic device of claim 1, wherein the anti-rotation mechanism comprises a magnet disposed in at least one of the display member and the base member.

9. The electronic device of claim 8, wherein, in response to the magnetic field generated by the magnet, the pin member is extendable from a retracted position to couple together the base member and the display member.

10. An electronic device, comprising:
 a hinge assembly configured to pivotally secure a display member in a fixed position relative to a latchless base member without either a latch or a locking mechanism securing the display member to the base member, the hinge assembly configured to enable rotational movement of the display member relative to the base member; and
 an anti-rotation mechanism including a pin member that moves in response to a magnetic field to a position between the display member and the base member to prevent rotational movement of the display member relative to the base member based on a position of the display member relative to the base member.

11. The electronic device of claim 10 further comprising:
 a magnet in the display member that moves the pin member from a retracted position to an extended position;
 a spring that moves the pin member from the extended position to the retracted position.

12. The electronic device of claim 10, wherein the hinge assembly is a friction clutch hinge assembly.

13. The electronic device of claim 12, wherein the pin member is biased to the retracted position.

14. The electronic device of claim 10, wherein the pin member extends from a retracted position into a recess formed in at least one of the display member and the base member.

15. The electronic device of claim 10, wherein the anti-rotation mechanism comprises a magnet disposed in at least one of the display member and the base member.

16. The electronic device of claim 15, wherein, in response to a magnetic field generated by the magnet, the pin member is extendable from a retracted position to prevent rotation of the display member relative to the base member.

17. An electronic device, comprising:
 a hinge assembly that pivotally couples a display to a latchless base without either a latch or locking mechanism securing the display to the base; and
 an anti-rotation mechanism including a pin member that moves in response to a magnetic field to a position between the display and base to prevent rotational movement of the display relative to the base.

18. The electronic device of claim 17, wherein the anti-rotation mechanism comprises multiple pin members extendable and retractable relative to both bottom and top sides of the base.

19. The electronic device of claim 18, wherein the pin member is moveable throughout a thickness of the base to extend and retract through both top and bottom surfaces of the base.

20. The electronic device of claim 17, wherein the pin member moves to both retracted and extended positions without requiring a user to activate the anti-rotation mechanism.

* * * * *